L. I. BAKER.
PISTON RING.
APPLICATION FILED FEB. 8, 1915.
1,188,713. Patented June 27, 1916.
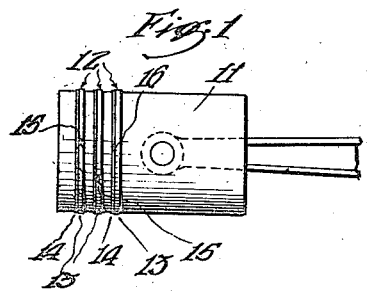
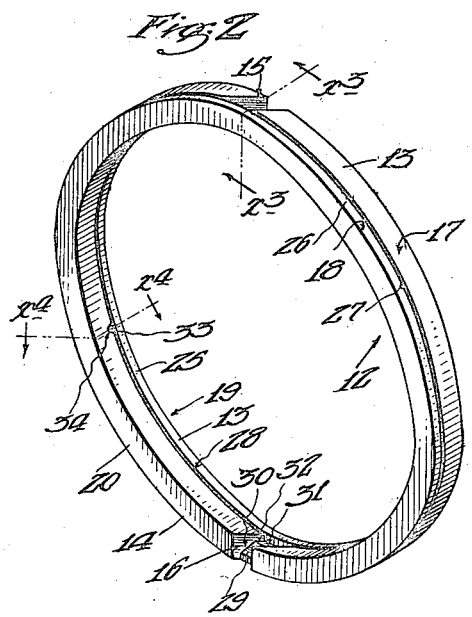
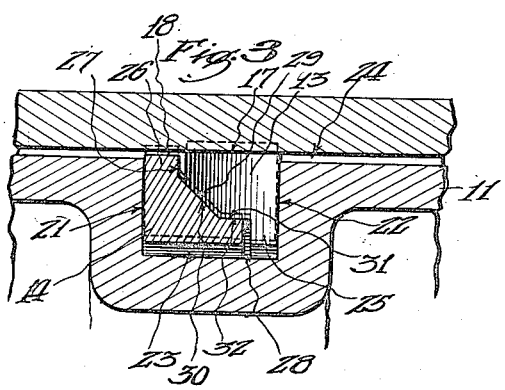
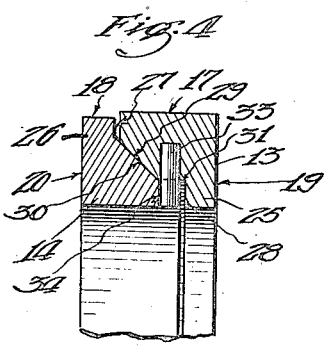
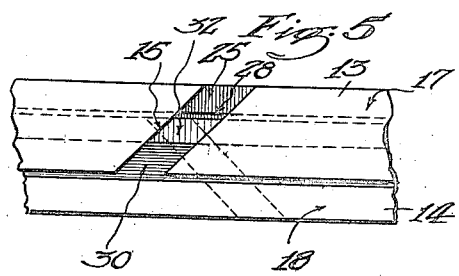
Witnesses:
H. M. Mansfield
P. H. Shulton
Inventor,
by Lyman I. Baker;
Townsend, Graham & Harris
his attys.

UNITED STATES PATENT OFFICE.

LYMAN I. BAKER, OF PASADENA, CALIFORNIA.

PISTON-RING.

1,188,713.  Specification of Letters Patent.  Patented June 27, 1916.

Application filed February 8, 1915. Serial No. 6,863.

*To all whom it may concern:*

Be it known that I, LYMAN I. BAKER, a citizen of the United States, residing at Pasadena, in the county of Los Angeles and State of California, have invented a new and useful Piston-Ring, of which the following is a specification.

My invention relates to machines, such as engines or compressors, in which a piston is reciprocated in a cylinder, and the principal object of the invention is to provide a piston ring for such a piston which will be a distinct advance in the art. Piston rings are necessary in such machines to make a gas tight joint between the piston and the walls of the cylinder, and are constructed of cast iron, being originally made somewhat larger in diameter than the bore of the cylinder and split so that they can be sprung into place. When properly constructed such rings are quite efficient, especially where they are used in pairs, the split in one ring coming on one side of the cylinder and the split in the other coming on the opposite side, so that there is very little leakage through the pair. Such rings have been used for many years in steam engine practice on low or medium pressures with very good success.

As the pressure in the cylinder is increased, tight rings become of greater importance. The trend in steam engine design is toward higher pressures, and internal combustion engines, especially those of the Diesel type require high pressures and tight pistons.

In my invention the principal object is accomplished by a new construction in which a pair of split rings are used, these rings being held in their proper relation by a guiding lip and pin. In my invention, the rings are so shaped that they make a tight closure with the walls of the cylinder and with the grooves in the piston in which they lie.

Referring to the drawing, which is for illustrative purposes only: Figure 1 is a view of a trunk piston equipped with my invention. Fig. 2 is a perspective view of a pair of rings sprung apart to better show the slots. Fig. 3 is an enlarged section through these rings on the plane $x^3$—$x^3$ of Fig. 2, a portion of the walls of the cylinder and piston also being shown. Fig. 4 is an enlarged section on the plane $x^4$—$x^4$ of Fig. 2. Fig. 5 is an enlarged end view showing the angular relation of the slots.

In the drawing, a piston 11 is shown equipped with three pairs of rings 12. In ordinary gas engine practice a single pair of rings is ordinarily sufficient, more rings being unnecessary except in engines working on very high pressures. Each of the pairs 12 is made up of a primary ring 13 and a secondary ring 14. The primary ring 13 has a slot 15 formed therein and the secondary ring 14 has a slot 16 formed therein, these slots being cut diagonally and in opposite directions. This is shown diagrammatically in Fig. 5 in which the slot 16 is shown in dotted lines in the position it would assume if it were twisted around opposite the slot 15. The ring 13 has a bearing face 17 formed on the outer edge thereof and a similar face 18 is formed on the ring 14. The ends 19 and 20 bear against the walls 21 and 22 of an annular groove 23 formed in the piston 11. The faces 18 bear against the inner surface or bore 24 of the cylinder, the size of the ring 14 being such that the face 18 touches the cylinder bore when the ring is in place as will be further described hereinafter. The ring 13 has an inwardly projecting lip 25, and the ring 14 has an outwardly projecting lip 26 on which the face 18 is formed. An inner primary surface 27 is formed on the end of the ring 13 adjacent to the side of the lip 26, and a similar inner secondary surface 28 is formed on the ring 14 adjacent to the side of the lip 25. The ring 13 has a beveled surface 29 formed thereon at an angle of approximately 45° and the ring 14 has a similar bevel 30 which coöperates with the beveled surface 29. A pressure groove 31 is formed in the ring 13, and an equalizing lip 32 is formed on the ring 14, fitting into the groove 31. A locking pin 33 is secured in the ring 13, projecting into the groove 31 and entering a notch 34 formed in the lip 32 of the ring 14.

The method of operation of my invention is as follows. The rings 13 and 14 are sprung into the groove 23 of the piston 11, lying loosely therein as shown in dotted lines in Fig. 3. The pin 33 is in the slot 34. The piston is then placed in the cylinder, the rings 13 and 14 being sprung down for this purpose assuming the position shown in full lines in Fig. 3. In this position the elasticity of the ring 13 holds the face 17 against the bore 24. The elasticity of the ring 14 also holds the face 17 against the bore 24, and in addition, due to the angle of the beveled surfaces 29 and 30, the elasticity of the ring 14 forces the rings apart, thus making a tight closure with the walls 21 and 22 of the slot 23. The proportions of the parts are such that the surface 18 makes a tight joint with the wall 24 when the rings are tightly jammed in the grooves 23. The wear of the surfaces 17 and 18 due to rubbing on the bore 24 tends to equalize the pressure on these surfaces. For example, if the surface 18 does not bear on the bore 24, wear on the surface 17 will soon bring the surface 18 into intimate bearing pressure, so that the rings 13 and 14 will divide the total pressure between them. This action is greatly assisted by the pressure equalizing lip 32 and the pressure equalizing groove 31. The ring 14 expands until the outer surface of the lip 32 touches the surface of the groove 31. The elasticity of the ring 14 is thus directly transmitted to the ring 13, tending to spread it against the cylinder bore 24. The pressure of the lip 32 in the groove 31 also tends to firmly close the joint between the rings so that there will be practically no leakage therethrough. This tight closure is not affected by subsequent wear on the surfaces 17 and 18.

The cutting of the slots 15 and 16 in opposite directions is for the purpose of providing a tight closure should the pin 34 become broken off, allowing the rings to slip around until the slots 15 and 16 overlap.

Various rings have been made in which a pin is used to insure the proper relationship of the parts. So far as I am aware the pin has been used in such a way that it projected away from the axis of the cylinder. This is very objectionable as a loose pin will score the cylinder so that it may require reboring. In my invention the pin projects inwardly and there is no danger of the cylinder walls being injured thereby.

I claim as my invention:—

1. A piston ring structure comprising a primary ring having a slot therein, a secondary ring having a slot therein and a locking pin rigidly secured in said primary ring and projecting downwardly toward the bottom of the piston groove; the primary ring having a primary cylindrical outer surface for making a tight closure with the wall of the cylinder, a primary inner surface at right angles to said outer cylindrical surface on the inner end of the primary ring, a primary end at right angles to the outer cylindrical surface at the outer end of the primary ring for making a tight closure with the wall of an annular groove in the piston in which the ring is placed, a primary beveled surface at an angle with said inner surface, and adjacent to said inner surface, a pressure equalizing groove adjacent to said beveled surface, said pressure equalizing groove having a cylindrical form, and an inwardly projecting lip between said pressure equalizing groove and said primary end; and said secondary ring having a secondary cylindrical surface, a secondary end at right angles to said outer cylindrical surface and immediately adjacent thereto, a secondary inner surface at right angles to said secondary outer cylindrical surface and immediately adjacent thereto, a secondary beveled surface immediately adjacent to said secondary inner surface and coöperative with said primary beveled surface, and a pressure equalizing lip adjacent to said secondary beveled surface and projecting into said pressure equalizing groove in said primary ring.

2. A piston ring structure comprising a primary ring having a slot therein and a secondary ring having a slot therein; the primary ring having a primary cylindrical outer surface for making a tight closure with the wall of the cylinder, a primary inner surface at right angles to said outer cylindrical surface on the inner end of the primary ring, a primary end at right angles to the outer cylindrical surface at the outer end of the primary ring for making a tight closure with the wall of an annular groove in the piston in which the ring is placed, a primary beveled surface at an angle with said inner surface, and adjacent to said inner surface, a pressure equalizing groove adjacent to said beveled surface, said pressure equalizing groove having a cylindrical form, a locking pin secured in said primary member and projecting into said pressure equalizing groove, and an inwardly projecting lip between said pressure equalizing groove and said primary end; and said secondary ring having a secondary cylindrical surface, a secondary end at right angles to said outer cylindrical surface and immediately adjacent thereto, a secondary inner surface at right angles to said secondary outer cylindrical surface and immediately adjacent thereto, a secondary beveled surface immediately adjacent to said secondary inner surface and coöperative with said primary beveled surface, and a pressure equalizing lip adjacent to said secondary beveled surface and projecting into said pressure equalizing groove in said primary ring, said pressure equalizing lip having a notch cut therein into which said locking pin projects.

3. A piston ring structure comprising a primary ring having a slot therein and a secondary ring having a slot therein, said slots being inclined in opposite directions; the primary ring having a primary cylindrical outer surface for making a tight closure with the wall of the cylinder, a primary inner surface at right angles to said outer cylindrical surface on the inner end of the primary ring, a primary end at right angles to the outer cylindrical surface at the outer end of the primary ring for making a tight closure with the wall of an annular groove in the piston in which the ring is placed, a primary beveled surface at an angle with said inner surface, and adjacent to said inner surface, a pressure equalizing groove adjacent to said beveled surface, said pressure equalizing groove having a cylindrical form, and an inwardly projecting lip between said pressure equalizing groove and said primary end; and said secondary ring having a secondary cylindrical surface, a secondary end at right angles to said outer cylindrical surface and immediately adjacent thereto, a secondary inner surface at right angles to said secondary outer cylindrical surface and immediately adjacent thereto, a secondary beveled surface immediately adjacent to said secondary inner surface and coöperative with said primary beveled surface, and a pressure equalizing lip adjacent to said secondary beveled surface and projecting into said pressure equalizing groove in said primary ring.

4. A piston ring structure comprising a primary ring having a slot therein and a secondary ring having a slot therein, said slots being inclined in opposite directions; the primary ring having a primary cylindrical outer surface for making a tight closure with the wall of the cylinder, a primary inner surface at right angles to said outer cylindrical surface on the inner end of the primary ring, a primary end at right angles to the outer cylindrical surface at the outer end of the primary ring for making a tight closure with the wall of an annular groove in the piston in which the ring is placed, a primary beveled surface at an angle with said inner surface, and adjacent to said inner surface, a pressure equalizing groove adjacent to said beveled surface, said pressure equalizing groove having a cylindrical form, a locking pin secured in said primary member and projecting into said pressure equalizing groove, and an inwardly projecting lip between said pressure equalizing groove and said primary end; and said secondary ring having a secondary cylindrical surface, a secondary end at right angles to said outer cylindrical surface and immediately adjacent thereto, a secondary inner surface at right angles to said secondary outer cylindrical surface and immediately adjacent thereto, a secondary beveled surface immediately adjacent to said secondary inner surface and coöperative with said primary beveled surface, and a pressure equalizing lip adjacent to said secondary beveled surface and projecting into said pressure equalizing groove in said primary ring, said pressure equalizing lip having a notch cut therein into which said locking pin projects.

In testimony whereof, I have hereunto set my hand at Los Angeles, California, this 1st day of February, 1915.

LYMAN I. BAKER.

In presence of—
 FRED A. MANSFIELD,
 FORD W. HARRIS.